US012668550B2

(12) United States Patent
Sudre et al.

(10) Patent No.: US 12,668,550 B2
(45) Date of Patent: Jun. 30, 2026

(54) MULTILAYER COATING FOR OXIDATION PROTECTION

(71) Applicant: Raytheon Technologies Corporation, Farmington, CT (US)

(72) Inventors: Olivier H. Sudre, Glastonbury, CT (US); Evan B. Callaway, Santa Barbara, CA (US); Daniel L. Becerra, West Hartford, CT (US); Mary Colby, West Hartford, CT (US); Cristal Chan, East Hampton, CT (US)

(73) Assignee: RTX Corporation, Farmington, CT (US)

( * ) Notice: Subject to any disclaimer, the term of this patent is extended or adjusted under 35 U.S.C. 154(b) by 504 days.

(21) Appl. No.: 18/202,036

(22) Filed: May 25, 2023

(65) Prior Publication Data

US 2023/0382811 A1       Nov. 30, 2023

Related U.S. Application Data

(60) Provisional application No. 63/345,597, filed on May 25, 2022.

(51) Int. Cl.
*C04B 35/80* (2006.01)
*C04B 35/628* (2006.01)

(52) U.S. Cl.
CPC ........ *C04B 35/80* (2013.01); *C04B 35/62863* (2013.01); *C04B 35/62868* (2013.01); *C04B 35/62871* (2013.01); *C04B 35/62873* (2013.01); *C04B 35/62876* (2013.01); *C04B 35/62878* (2013.01); *C04B 35/62894* (2013.01);
(Continued)

(58) Field of Classification Search
None
See application file for complete search history.

(56) References Cited

U.S. PATENT DOCUMENTS 5,455,106 A * 10/1995 Steffier .............. C04B 35/62897
442/127
2014/0273681 A1    9/2014 Chamberlain et al.
(Continued)

FOREIGN PATENT DOCUMENTS

EP            2970017 B1      7/2019
WO       2014150393 A2      9/2014

OTHER PUBLICATIONS

Extended European Search Report for EP Application No. 23175446.6, dated Oct. 23, 2023, 7 pages.

*Primary Examiner* — Shawn McKinnon
(74) *Attorney, Agent, or Firm* — Kinney & Lange, P.A.

(57) ABSTRACT

A coated fiber structure for use in a ceramic matrix composite comprises a fiber and a coating system applied to and circumscribing the fiber. The coating system comprises an interface coating layer in direct contact with the fiber, the interface coating layer comprising one of boron nitride and a boron-doped pyrocarbon, at least one intermediate layer extending coaxially with and in direct contact with the interface layer, the at least one intermediate layer comprising at least one of silicon and boron nitride, and an outer layer extending coaxially with and in direct contact with the interface layer. At least one of the interface coating layer, the at least one intermediate layer, and the outer layer comprises a metallic element.

14 Claims, 4 Drawing Sheets

(52) U.S. Cl.
    CPC .................. C04B 35/62897 (2013.01); *C04B*
                *2235/3826* (2013.01); *C04B 2235/5244*
                                        (2013.01)

(56)                References Cited

U.S. PATENT DOCUMENTS

| | | | |
|---|---|---|---|
| 2015/0274979 A1* | 10/2015 | Lazur ..................... | D06M 11/58 |
| | | | 428/216 |
| 2016/0159694 A1* | 6/2016 | Chamberlain .... | C04B 35/62863 |
| | | | 501/154 |
| 2017/0002667 A1 | 1/2017 | Steinwandel et al. | |
| 2021/0040651 A1 | 2/2021 | Sheedy et al. | |

* cited by examiner

MULTILAYER COATING FOR OXIDATION PROTECTION

CROSS-REFERENCE TO RELATED APPLICATION(S)

This application claims the benefit of U.S. Provisional Application No. 63/345,597 filed May 25, 2022 for "MULTILAYER COATING FOR OXIDATION PROTECTION" by O. H. Sudre, E. B. Callaway, D. L. Becerra, M. Colby, and C. Chan.

BACKGROUND

The present invention relates to ceramic matrix composites, and more particularly to the formation of corrosion-resistant coatings therein.

Fiber-reinforced ceramic matrix composites (CMCs) are known and used for components that are exposed to high temperatures and corrosive conditions that can degrade other kinds of materials. Under such severe conditions, such as the operating conditions in aerospace and aircraft applications, even ceramic materials are vulnerable to degradation. Over time, ceramic composites can form microcracks that further expose the ceramic material to oxygen or other corrosive elements, which form undesirable phases to the detriment of the properties of the ceramic matrix composite component.

Fibers can be coated with a layer of boron nitride to form a weak interface between the fibers and matrix material to enable desired composite characteristics. Boron nitride can sometimes form with a disordered structure that readily oxidizes and leads to fiber degradation. A silicon dopant can improve oxidation resistance of the boron nitride by forming silica, but certain high temperature conditions can cause the silica to evaporate. Therefore, composites based on such interfaces can lack sufficient durability and/or fracture toughness at particularly high temperatures in extreme operating environments. Thus, coating materials with a greater oxidation resistance are desirable.

SUMMARY

A coated fiber structure for use in a ceramic matrix composite comprises a fiber and a coating system applied to and circumscribing the fiber. The coating system comprises an interface coating layer in direct contact with the fiber, the interface coating layer comprising one of boron nitride and a boron-doped pyrocarbon, at least one intermediate layer extending coaxially with and in direct contact with the interface layer, the at least one intermediate layer comprising at least one of silicon and boron nitride, and an outer layer extending coaxially with and in direct contact with the interface layer. At least one of the interface coating layer, the at least one intermediate layer, and the outer layer comprises a metallic element.

A ceramic matrix composite comprises a plurality of ceramic fibers, a coating system applied to and circumscribing each fiber of the plurality of fibers, and a matrix deposited on the plurality of fibers and the coating system. The coating system comprises an interface coating layer in direct contact with the fiber, the interface coating layer comprising boron nitride, at least one intermediate layer extending coaxially with and in direct contact with the interface layer, the at least one intermediate layer comprising at least one of silicon and boron nitride, and an outer layer extending coaxially with and in direct contact with the interface layer. At least one of the interface coating layer, the at least one intermediate layer, and the outer layer comprises a metallic element.

Figure 1:
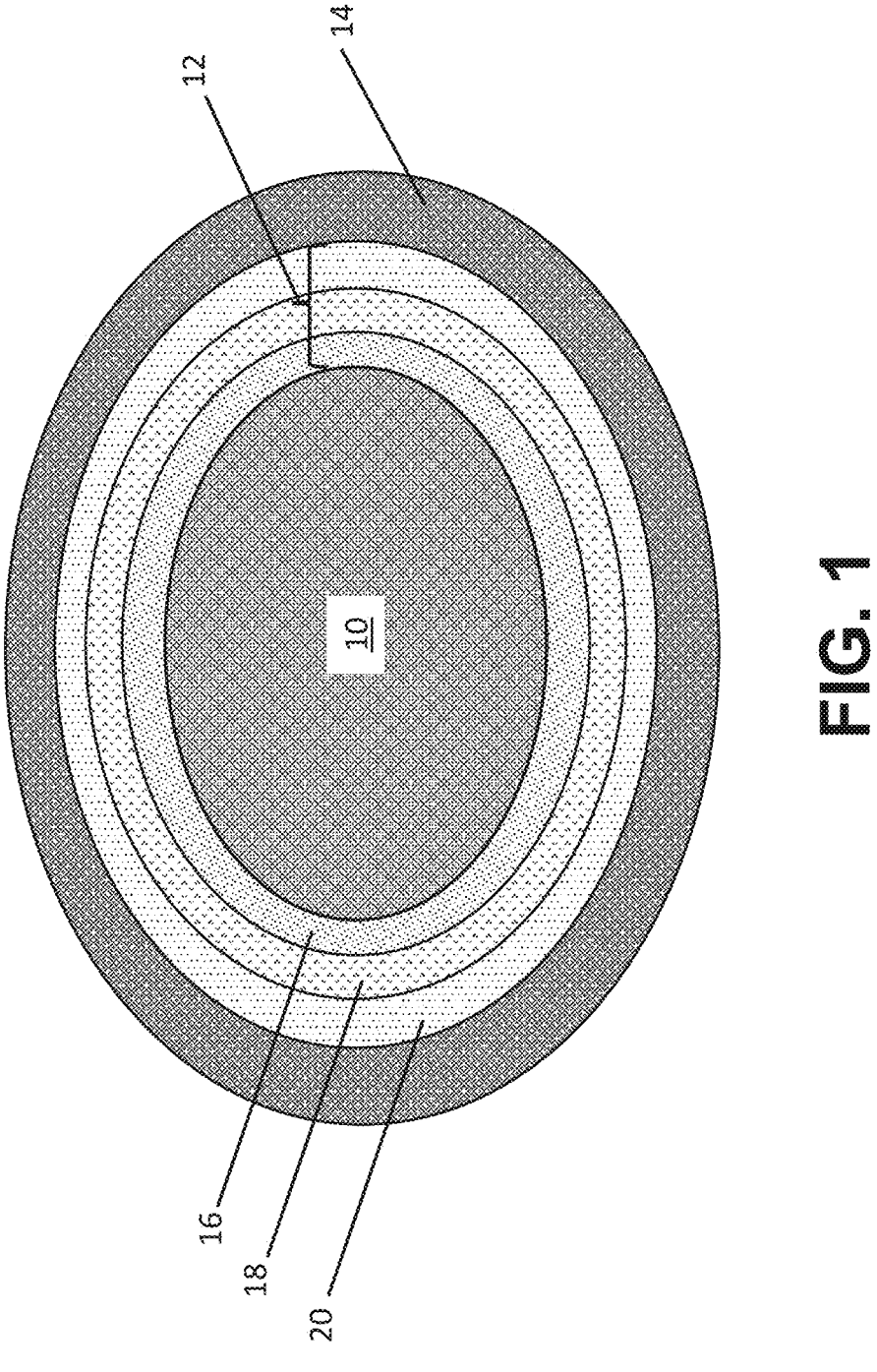
FIG. 1 is a simplified cross-sectional view of a ceramic fiber of a CMC with a fiber coating system.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents various fiber coating systems for improving mechanical, thermal, and/or oxidation resistance properties of CMCs. Each coating system includes a boron-containing interface coating. Additional layers containing silicon nitrides, silicon carbides, metallic nitrides, and/or metallic carbides can be included. The coating systems help form a more stable silica glass in high-temperature operating environments.

FIG. 1 is a simplified cross-sectional view of coated ceramic fiber 10 belonging to a CMC suitable for use in, for example, a gas turbine engine. Fiber 10 is circumscribed by fiber coating system 12 and matrix 14. In the embodiment shown in FIG. 1, fiber coating system 12 includes innermost layer 16 in direct contact with fiber 10, intermediate layer 18 in direct contact with innermost layer 16, and outermost layer 20 in direct contact with intermediate layer 18. When deposited, matrix 14 surrounds outermost layer 20 of fiber coating system 12, such that fiber coating system 12 is disposed radially between fiber 10 and matrix 14. In general, the layers of coating system 12 are coaxial with fiber 10.

Fiber 10 can be formed from silicon carbide (SiC) or other suitable ceramic material. Multiple fibers 10 of the encompassing CMC can be arranged in various woven or non-woven, unidirectional or multidirectional architectures. Innermost layer 16 can be an interface coating (IFC) layer formed from boron nitride (BN). Intermediate layer 18 can be formed from silicon-doped boron nitride (SiBN). Outermost layer 20 can be a glass-modifying layer formed from a compound including a metallic element, such as zirconium (Zr), hafnium (Hf), aluminum (Al), to name a few non-limiting examples. Rare earth metals are also contemplated herein. In some embodiments, outermost layer 20 can include combinations of such metallic elements to further improve the strength of the resulting glass network, discussed in greater detail below. The metallic element can be paired with nitrogen (N) to form a nitride (e.g., ZrN), with BN to form a zirconium-doped boron nitride (e.g., ZrBN), or with carbon (C) to form a zirconium-doped carbon or carbide (e.g., ZrC). Generally speaking, each of layers 16, 18, and 20 can have a thickness ranging from 20 nm to 1.0 micron, and preferably, 50 nm to 500 nm. Matrix 14 can be formed from SiC or other suitable ceramic material.

In operation of a CMC including fiber coating system 12, cracks form in matrix 14, and boron within the innermost layer 16 and/or intermediate layer 18 begins to oxidize and evaporate, with silica (i.e., glass of silicon dioxide—$SiO_2$) predominating. This desirable formation of silica can usually continue in temperatures slightly above 2000° F. (1093° C.). However, as temperatures exceed 2300° F. (1260° C.), silica can become fluid and, if water vapor is present, can begin to evaporate and leave fiber 10 vulnerable to degradation. The metallic nitride/carbide (e.g., ZrN) introduced via the outermost layer 20 interacts with and stabilizes the silica to form a network of metallic-silicate glass with a higher transition temperature and higher viscosity, compared to silica alone, that is less susceptible to evaporation at high temperatures and in the presence of water vapor. As used herein, the term "glass" should be understood to mean a non-crystalline structure. Under certain conditions, a subset of the added metallic element(s) can additionally precipitate in the glass as oxides, but will still contribute to the increased viscosity and reduced evaporation of the glass. If the metallic element is alternatively introduced to innermost layer 16 and/or intermediate layer 18 instead of being formed as outermost layer 20, a more homogenous glass can form since the reaction of the various compounds within layers 16 and/or 18 are exposed to oxygen at the same time.

Figure 2:
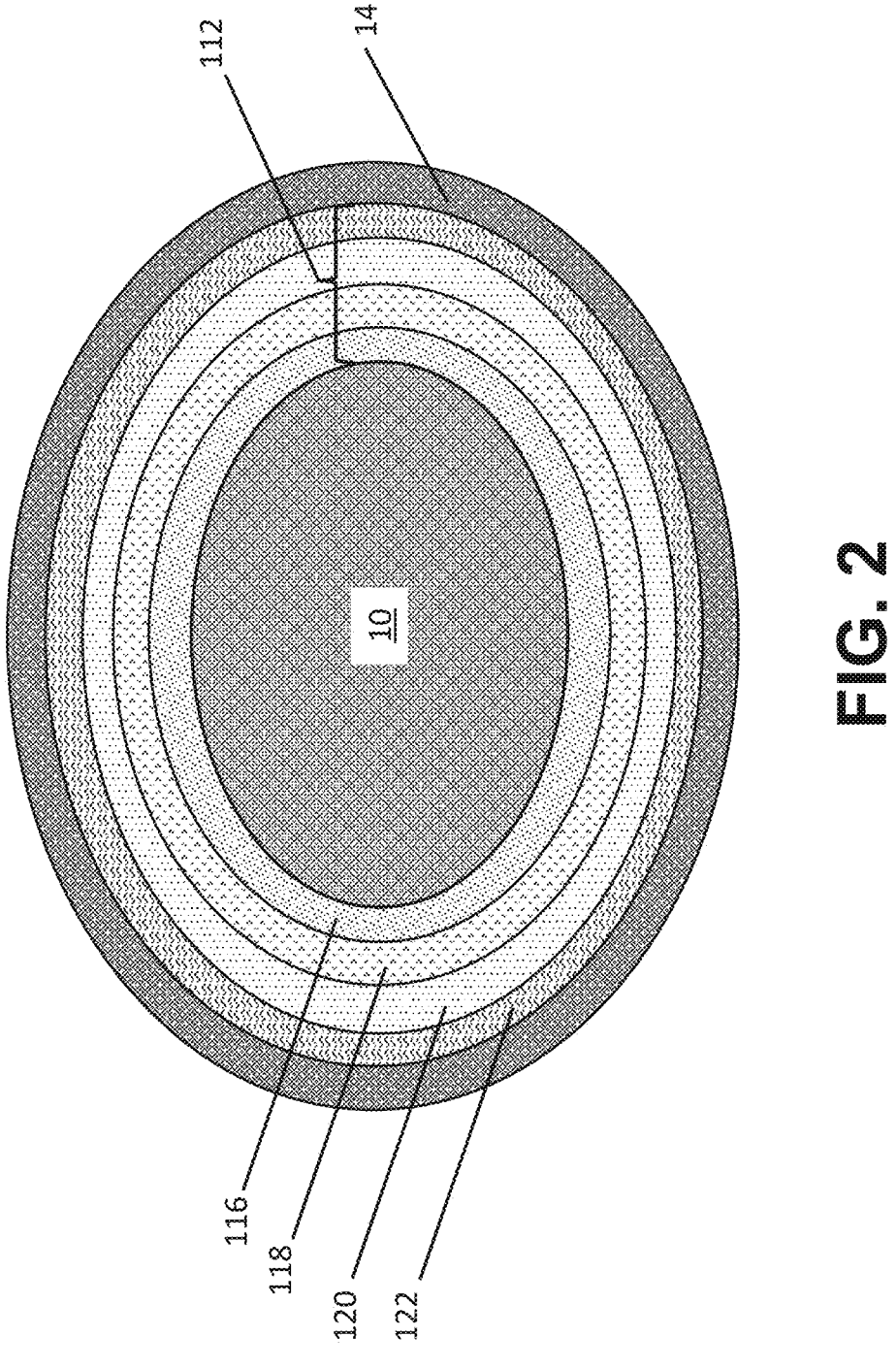
FIG. 2 is a simplified cross-sectional view of the ceramic fiber with a first alternative fiber coating system.

FIG. 2 is a simplified cross-sectional view of fiber 10 with alternative fiber coating system 112 having innermost layer 116 in direct contact with fiber 10, first intermediate layer 118 in direct contact with innermost layer 116, second intermediate layer 120 in direct contact with first intermediate layer 118, and outermost layer 122 in direct contact with second intermediate layer 118. Matrix 14 generally surrounds outermost layer 122 of fiber coating system 112, and like the embodiment of FIG. 1, both fiber 10 and matrix 14 can be formed from SiC. Innermost layer 116, like innermost layer 16, can be an IFC layer of BN. First intermediate layer 118 can be formed from SiBN. Second intermediate layer 120 can include the one or more metallic elements as nitrides and/or carbides (e.g., ZrN), similar to outermost layer 20 of FIG. 1. Outermost layer 122 can include silicon nitride ($Si_3N_4$). The addition of a layer of $Si_3N_4$ allows for a more silicon-rich oxide (with metallic and other elements) to form at high temperatures. Additionally, the nitrogen gas that forms upon oxidation of the silicon can help control oxidation and/or evaporation of silicon and/or the metallic elements. Each of layers 116, 118, 120, and 122 can have a thickness ranging from 20 nm to 1.0 micron, and preferably, 50 nm to 500 nm.

Additional alternative embodiments based on coating system 12 and/or 112 can include innermost/IFC layer 16, 116 formed from SiBN, such that intermediate layer 18, 118 can be omitted. Additionally and/or alternatively, distinct metallic layers (i.e., outermost layer 20 or second intermediate layer 120) can be omitted and the metal nitride or metal carbide can instead can be added to one or the other of innermost layer 16, 116 or intermediate layer 18/first intermediate layer 118. In some cases, the formation of layers with multiple compounds can be more complex, but may react more favorably under operating conditions, such as forming a more homogenous glass network as discussed above.

Figure 3:
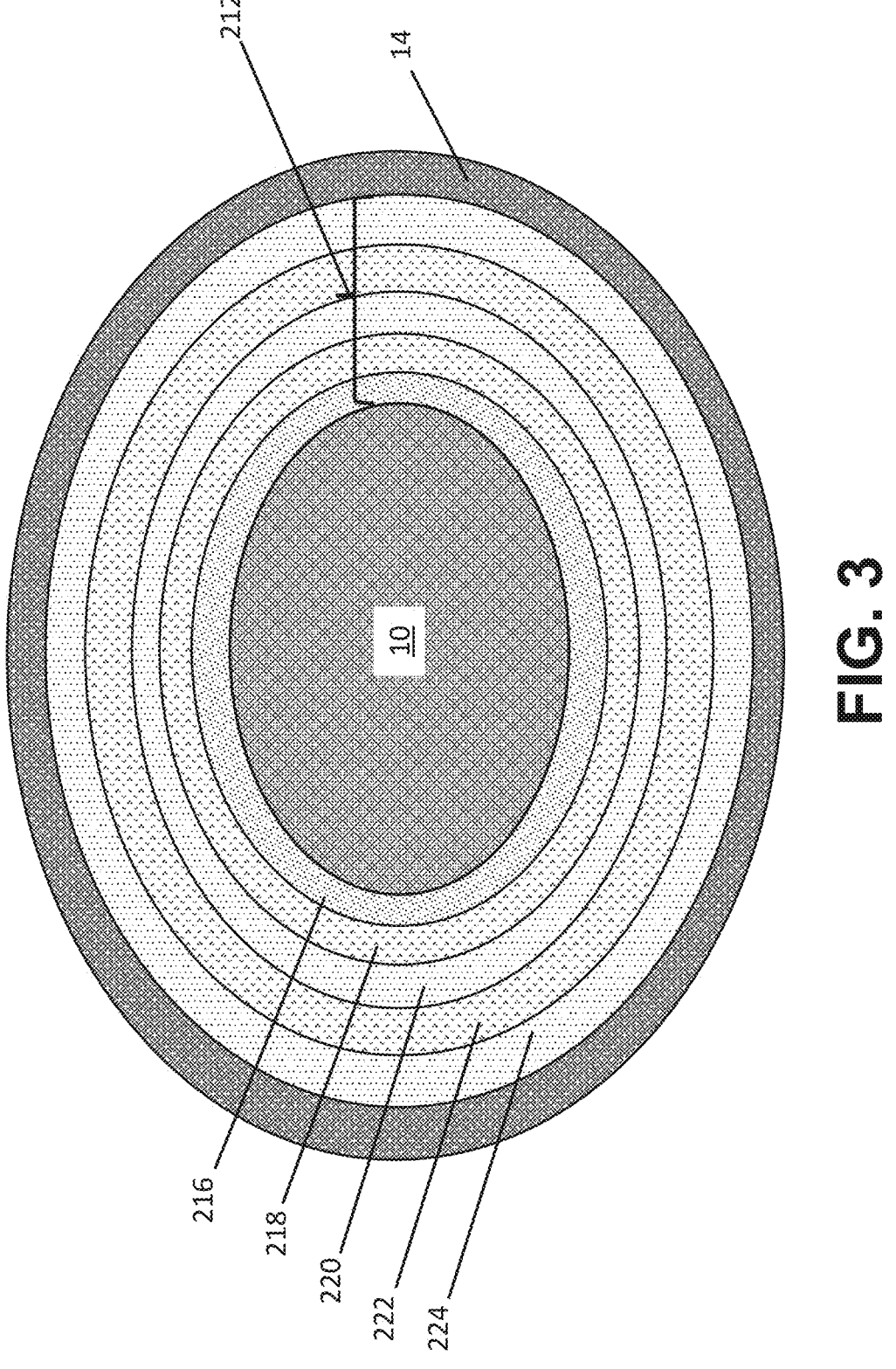
FIG. 3 is a simplified cross-sectional view of the ceramic fiber with a second alternative fiber coating system.

FIG. 3 is a simplified cross-sectional view of coated ceramic fiber 10 with second alternative coating system 212. Like the embodiments of FIGS. 1 and 2, both fiber 10 and matrix 14 can be formed from SiC. Coating system 212 includes innermost layer 216 in direct contact with fiber 10, first intermediate layer 218 in direct contact with innermost layer 216, second intermediate layer 220 in direct contact with first intermediate layer 218, third intermediate layer 222 in direct contact with second intermediate layer 220, and outermost layer 224 in direct contact with third intermediate layer 222. Matrix 14 generally surrounds outermost layer 224 of fiber coating system 212. Each of layers 216, 218, 220, 222, and 224 can have a thickness ranging from 20 nm to 1.0 micron, and preferably, 50 nm to 500 nm. Like innermost layers 16 and 116, innermost layer 216 can be an IFC layer formed from BN. First intermediate layer 218 can be formed from SiC. Second intermediate layer 220 can, like innermost layer 216, be formed from BN. Third intermediate layer 222 can be formed from SiBN. Outermost layer 124 can be formed from metallic elements (e.g., Zr, Hf, Al, rare earth elements, etc.) as nitrides or carbides.

Under operating conditions, second intermediate layer 220, the outermost BN layer, experiences crack deflection, debonding, and/or sliding. Layers 220, 222, and 224 can undergo some degree of oxidation from exposure to oxidants, and a metallic-silicate glass forms at high temperatures (i.e., >2000° F.) and/or in the presence of water vapor. Innermost layer 216 and first intermediate layer 218 are positioned concentrically within the debonded, second intermediate layer 220, and therefore receive greater protection from oxidation. This protection persists even as layers 220, 222, and 224 slowly degrade over some operational period of the composite, thus extending the life of the composite.

An alternative embodiment of coating system 212 can include additional layers, for example, SiBN and/or metallic nitrides/carbides between innermost layer 216 and first intermediate layer 218. Such additional layers can further extend the life of the composite and coating system 212 as layers 220, 222, and 224 degrade. A layer of carbon can additionally and/or alternative be added between first intermediate layer 218 and second intermediate layer 220 to promote debonding of second intermediate layer 220. This carbon layer can have a thickness ranging from 10 nm to 40 nm. Finally, a layer of $Si_3N_4$ can additionally and/or alternatively be formed over outermost layer 224 such that it becomes the outermost layer.

Figure 4:
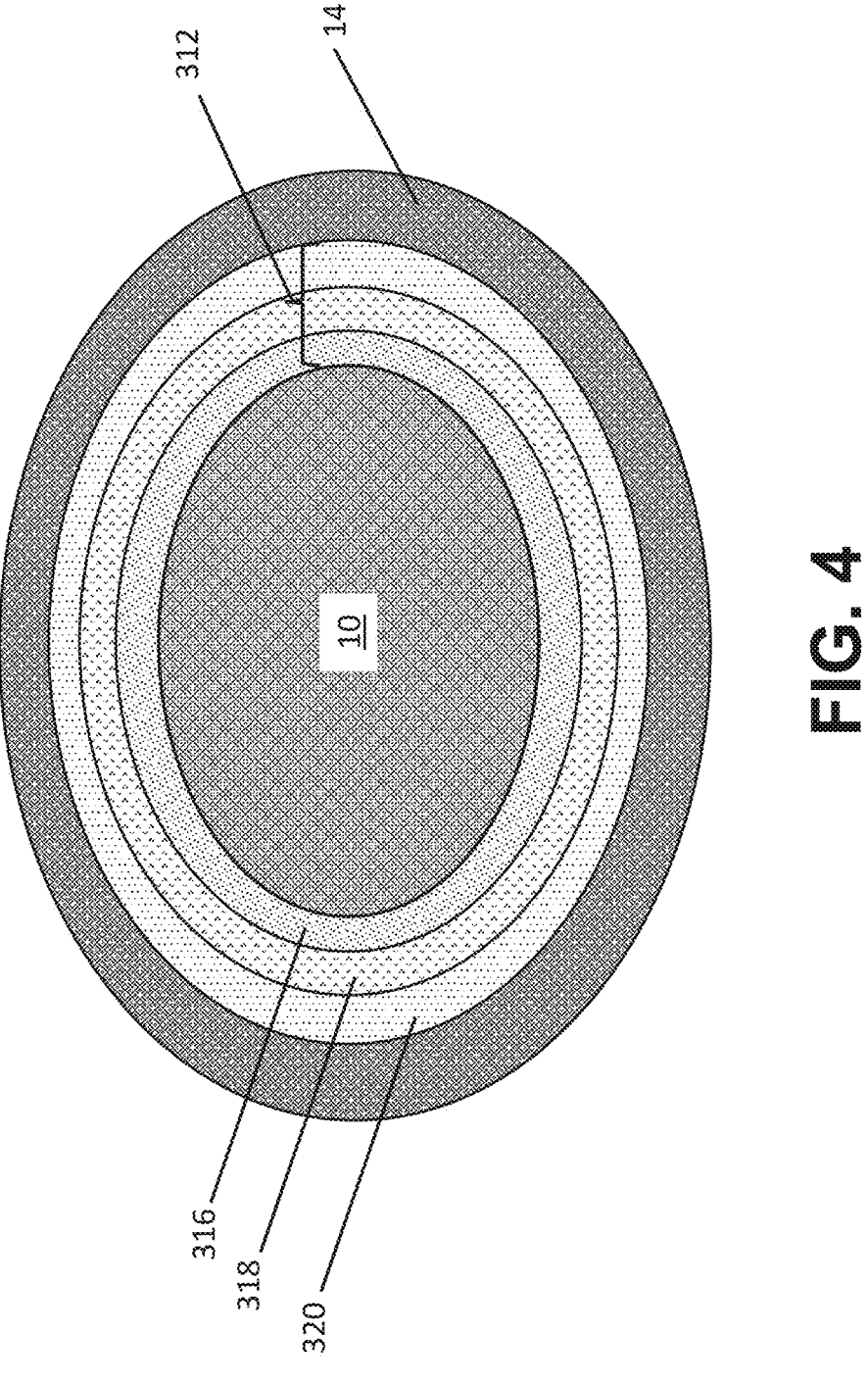
FIG. 4 is a simplified cross-sectional view of the ceramic fiber with a third alternative fiber coating system.

FIG. 4 is a simplified cross-sectional view of coated ceramic fiber 10 with third alternative coating system 312. Like the embodiments of FIGS. 1, 2, and 3, both fiber 10 and matrix 14 can be formed from SiC. Coating system 312 includes innermost layer 316 in direct contact with fiber 10, intermediate layer 318 in direct contact with innermost layer 316, and outermost layer 320 in direct contact with intermediate layer 318. Matrix 14 generally surrounds outermost layer 320 of fiber coating system 312. Each of layers 316, 318, and 320 can have a thickness ranging from 20 nm to 1.0 micron, and preferably, 50 nm to 500 nm. Innermost layer 316 can be an IFC layer formed from boron-doped pyrocarbon (B-PyC). Intermediate layer 318 can be formed from $Si_3N_4$. Outermost layer 320 can be formed from metallic elements (e.g., Zr, Hf, Al, rare earth elements, etc.) as nitrides or carbides. In an alternative embodiment of coating system 312, intermediate layer 318 (i.e., the $Si_3N_4$) can be omitted such that the coating system includes an outermost layer of the metallic element in direct contact with innermost layer 316.

Innermost layer 316 of B-PyC can form a stronger bond, in some cases, with fiber 10. As such, under operating conditions, cracks propagating from matrix 14 into coatings system 316 can be preferentially arrested and/or deflected tortuously without reaching the surface of fiber 10. $Si_3N_4$, if included, and the metallic elements can form as oxidation resistant metallic-silicate glass, as discussed above with respect to the alternative coatings systems.

Coating systems 12, 112, 212, and 312 (collectively referred to as "coating systems 12-312") can be deposited on fiber 10 using chemical vapor infiltration (CVI). More specifically, each layer of the respective coating system can be applied in successive rounds of CVI starting from innermost layer 16, 116, 216, 316 and working outward. To introduce the metallic element (e.g., Zr) of coating systems 12-312, a chlorinator can be included as part of the CVI gas supply to form the applicable gaseous precursor (e.g., $ZrCl_4$). The chloride precursor can subsequently be reacted with ammonia ($NH_3$) or nitrogen ($N_2$) with hydrogen ($H_2$) to remove the chlorine (as HCL). It should be understood that when infiltrating layered arrangements of woven or nonwoven fibers 10, coating systems 12-312 may not apply evenly on each fiber 10 or at all. This is particularly true for the innermost fibers 10 (i.e., those along a midpoint of the thickness of a preform).

Once all desired layers of coating system 12-312 have been applied, matrix 14 can be deposited using CVI, which will be carried out until the resulting CMC has reached the desired residual porosity. Other techniques for matrix formation are contemplated herein, such as one or a combination of slurry infiltration, melt infiltration, and polymer infiltration and pyrolysis. Protective coatings for the CMC (e.g., thermal barrier coatings, environmental barrier coatings, etc.) can optionally be included.

A CMC component formed with the disclosed fiber coating systems can be incorporated into aerospace, maritime, or industrial equipment, to name a few, non-limiting examples.

Discussion of Possible Embodiments

The following are non-exclusive descriptions of possible embodiments of the present invention.

A coated fiber structure for use in a ceramic matrix composite comprises a fiber and a coating system applied to and circumscribing the fiber. The coating system comprises an interface coating layer in direct contact with the fiber, the interface coating layer comprising one of boron nitride and a boron-doped pyrocarbon, at least one intermediate layer extending coaxially with and in direct contact with the interface layer, the at least one intermediate layer comprising at least one of silicon and boron nitride, and an outer layer extending coaxially with and in direct contact with the interface layer. At least one of the interface coating layer, the at least one intermediate layer, and the outer layer comprises a metallic element.

The fiber structure of the preceding paragraph can optionally include, additionally and/or alternatively, any one or more of the following features, configurations and/or additional components:

In the above fiber structure, the fiber can be formed from silicon carbide.

In any of the above fiber structures, the metallic element can be selected from the group consisting of zirconium, hafnium, rare earth metals, and combinations thereof.

In any of the above fiber structures the metallic element can be formed as one of a carbide and a nitride.

In any of the above fiber structures, the outer layer can include the metallic element.

In any of the above fiber structures, one of the interface coating layer and the intermediate layer can include the metallic element.

In any of the above fiber structures, the at least one intermediate layer can include silicon-doped boron nitride.

In any of the above fiber structures, the at least one intermediate layer can further include a first intermediate layer in direct contact with the interface coating layer, and a second intermediate layer in direct contact with the first intermediate layer.

In any of the above fiber structures, the first intermediate layer can include silicon-doped boron nitride.

In any of the above fiber structures, the second intermediate layer can include the metallic element, and the metallic element can be selected from the group consisting of zirconium, hafnium, rare earth metals, and combinations thereof.

In any of the above fiber structures, the outermost layer can be in direct contact with the second intermediate layer, and the outermost layer can include silicon nitride.

In any of the above fiber structures, the first intermediate layer can include silicon carbide.

In any of the above fiber structures, the second intermediate layer can include boron nitride.

Any of the above fiber structures can further include a third intermediate layer in direct contact with the second intermediate layer, and the third intermediate layer can include silicon-doped boron nitride.

In any of the above fiber structures, the outermost layer can be in direct contact with the third intermediate layer, the outermost layer can include the metallic element, and the metallic element can be selected from the group consisting of zirconium, hafnium, rare earth metals, and combinations thereof.

In any of the above fiber structures, each of the interface coating layer, the at least one intermediate layer, and the outermost layer can have a thickness ranging from 20 nm to 1.0 micron.

A ceramic matrix composite comprises a plurality of ceramic fibers, a coating system applied to and circumscribing each fiber of the plurality of fibers, and a matrix deposited on the plurality of fibers and the coating system. The coating system comprises an interface coating layer in direct contact with the fiber, the interface coating layer comprising one of boron nitride and a boron-doped pyrocarbon, at least one intermediate layer extending coaxially with and in direct contact with the interface layer, the at least one intermediate layer comprising at least one of silicon and boron nitride, and an outer layer extending coaxially with and in direct contact with the interface layer. At least one of the interface coating layer, the at least one intermediate layer, and the outer layer comprises a metallic element.

The composite of the preceding paragraph can optionally include, additionally and/or alternatively, any one or more of the following features, configurations and/or additional components:

In the above composite, the matrix can be formed from silicon carbide.

In any of the above composites, the outermost layer can include the metallic element.

In any of the above composites, the metallic element can be selected from the group consisting of zirconium, hafnium, rare earth metals, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A coated fiber structure for use in a ceramic matrix composite, the coated fiber structure comprising:
   a fiber; and
   a coating system applied to and circumscribing the fiber, the coating system comprising:
      an interface coating layer in direct contact with the fiber, the interface coating layer comprising one of boron nitride and a boron-doped pyrocarbon;
      a first intermediate layer extending coaxially with and in direct contact with the interface coating layer, the first intermediate layer comprising silicon carbide;
      a second intermediate layer in direct contact with the first intermediate layer, wherein the second intermediate layer comprises boron nitride;
      a third intermediate layer in direct contact with the second intermediate layer, wherein the third intermediate layer comprises silicon-doped boron nitride; and
      an outer layer extending coaxially with and in direct contact with the third intermediate layer;
      wherein at least one of the interface coating layer, the first intermediate layer, the second intermediate layer, the third intermediate layer, and the outer layer comprises a metallic element.

2. The fiber structure of claim 1, wherein the fiber is formed from silicon carbide.

3. The fiber structure of claim 1, wherein the metallic element is selected from the group consisting of zirconium, hafnium, rare earth metals, and combinations thereof.

4. The fiber structure of claim 3, wherein the metallic element is formed as one of a carbide and a nitride.

5. The fiber structure of claim 3, wherein the outer layer comprises the metallic element.

6. The fiber structure of claim 3, wherein one of the interface coating layer, the first intermediate layer, the second intermediate layer, and the third intermediate layer comprises the metallic element.

7. The fiber structure of claim 1, wherein the second intermediate layer comprises the metallic element, and wherein the metallic element is selected from the group consisting of zirconium, hafnium, rare earth metals, and combinations thereof.

8. The fiber structure of claim 7, wherein the outer layer comprises silicon nitride.

9. The fiber structure of claim 1, wherein the outer layer comprises the metallic element, and wherein the metallic element is selected from the group consisting of zirconium, hafnium, rare earth metals, and combinations thereof.

10. The fiber structure of claim 1, wherein each of the interface coating layer, the first intermediate layer, the second intermediate layer, the third intermediate layer, and the outermost layer has a thickness ranging from 20 nm to 1.0 micron.

11. A ceramic matrix composite comprising:
   a plurality of ceramic fibers;
   a coating system applied to and circumscribing each fiber of the plurality of fibers,
      the coating system comprising:
         an interface coating layer in direct contact with the fiber, the interface coating layer comprising one of boron nitride and a boron-doped pyrocarbon;
         a first intermediate layer extending coaxially with and in direct contact with the interface coating layer, the at least one intermediate layer comprising silicon carbide;
         a second intermediate layer in direct contact with the first intermediate layer, wherein the second intermediate layer comprises boron nitride;
         a third intermediate layer in direct contact with the second intermediate layer, wherein the third intermediate layer comprises silicon-doped boron nitride; and
         an outer layer extending coaxially with and in direct contact with the third intermediate layer;
         wherein at least one of the interface coating layer, the first intermediate layer, the second intermediate layer, the third intermediate layer, and the outer layer comprises a metallic element; and
   a matrix deposited on the plurality of fibers and the coating system.

12. The composite of claim 11, wherein the matrix is formed from silicon carbide.

13. The composite of claim 11, wherein the outer layer comprises the metallic element.

14. The composite of claim 13, wherein the metallic element is selected from the group consisting of zirconium, hafnium, rare earth metals, and combinations thereof.

* * * * *